United States Patent Office 3,329,929
Patented July 4, 1967

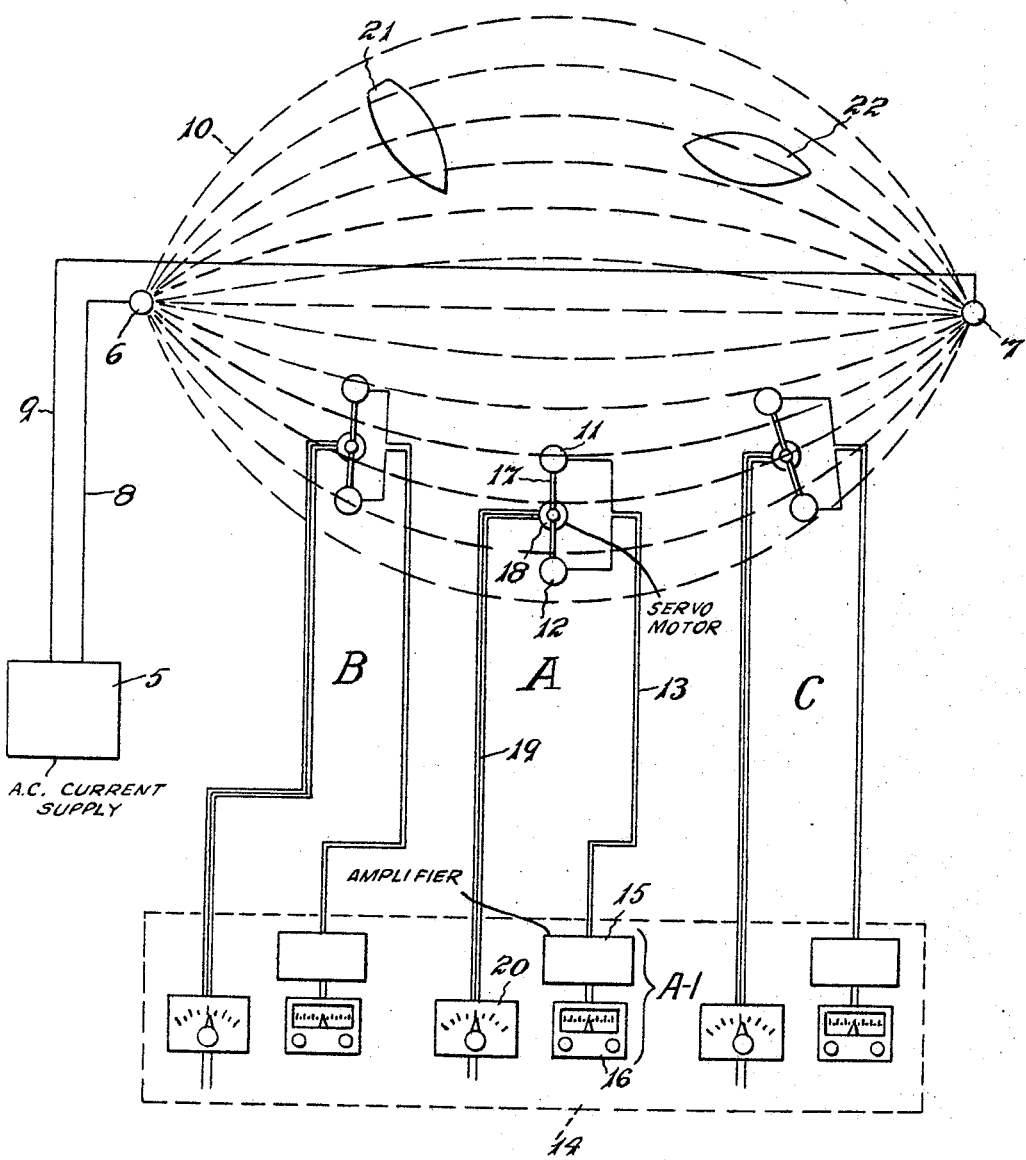

3,329,929
METHOD FOR UNDERWATER DETECTION
AND SYSTEM THEREFOR
Henry J. Burnett, 55 Glenbrook Road,
West Hartford, Conn. 06107
Filed May 7, 1965, Ser. No. 454,063
6 Claims. (Cl. 340—4)

This invention relates to a method for underwater detection and system therefor and, more particularly, to a method for detecting the entry of a foreign body into a selected underwater area.

The primary object of this invention is to provide an improved method for electronically detecting submerged bodies which are electrically conductive or non-conductive.

A further object is the provision of a system for a detection method which is highly efficient in its operation, easy to install and operative over large underwater areas.

A still further object is to provide adjustable current receiving means in said system whereby, in a selected underwater area, the electrical energy content at one side of said receiving means may be accurately balanced with the electrical content at the other side thereof so that the relative voltage drop due to lines of current flow in said receiving means will approach zero and the entry of any foreign body into said area will upset the electrically balanced condition between the opposite sides of the area and cause detection of said foreign body to be indicated by a suitable instrument in said system.

Further objects and advantages of this invention will be more clearly understood from the following description and the accompanying drawing which is a diagrammatic illustration of an electronic detection system whereby the objects of this invention are attained.

As shown in said drawing, the numeral 5 indicates a suitable transmitting station for supplying electrical energy in the form of alternating current to spaced submerged electrical transmitting terminals 6 and 7 through connecting electric cables 8 and 9, respectively. The alternating current from the electrical energy supplied by said transmitting terminals will flow between said terminals throughout the entire volume of water in the selected submerged area on lines of current flow indicated at 10 since the water in said area serves as a conductor for the electrical energy supplied to said transmitting terminals. Therefore, the entire volume of water in said submerged area becomes energized.

In order to detect the entry of a foreign body into said energized area, this invention provides a detecting system A which includes; two receiving terminals 11 and 12 provided preferably between the terminals 6 and 7 but generally in the electrified area and spaced apart and disposed on a line substantially at right angles to the direction of the current flow, or the lines 10 as shown in the single figure of the drawing.

The said receiving terminals 11 and 12 are electrically connected by twin conductors 13 to a detector A-1 that is located in a receiving station 14 and comprises a suitable high gain amplifier 15 whose output circuit is connected to a suitable indicator 16, such as an indicating meter which has a zero center indicating scale.

When the receiving terminals 11 and 12 are accurately positioned on a line which is disposed at right angles to the lines of current flow 10, the said receiving terminals are in a null, or minimum, position and the reading on the scale of the indicator 16 is "zero" and at the center of its scale. Under this condition, the electrical energy content in the water to the left of the receiving terminals is balanced out by the electrical energy content in the water at the right of said receiving terminals and the relative voltage drop due to current flow between said receiving terminals approaches zero and the system is in the most sensitive operative condition for the purpose of detection.

Now, when any foreign body, indicated at 21, or 22, enters this electrically balanced water area, it will upset the condition of electrical balance and cause the indicator 16 to show a deflection on its scale from the zero position to either the left or the right; depending upon the location of the foreign body.

If desired, a plurality of additional detecting systems B and C, similar to the system A, may be placed in any convenient locations to provide the desired coverage of a water area, or any degree of sensitivity of detection of approaching foreign bodies.

When a plurality of receiving systems is employed, an approaching foreign body will produce maximum deflection in the indicator 16 of the system whose receiving terminals are nearest to the said foreign body and, by observing the indicators of the different systems, the relative position of the foreign body is readily determined.

To provide for angular adjustment of the receiving terminals 11 and 12 relatively to the lines of current flow 10, for obtaining an accurate balance between the current flow on opposite sides of the said receiving terminals and a zero indication on the indicator 16, the receiving terminals 11 and 12 are preferably mounted upon opposite ends of a boom 17 which is rotatable by a suitable servo motor 18 connected by a power line 19 to a control 20 which operates said motor to position the receiving terminals. By operating said control, the receiving terminals may be rotated to the left or right towards a right angle to the current flow until the "null," or "zero," position is indicated on the scale of the indicator 16 of the respective detecting system, in which position said system will provide maximum sensitivity.

Tracking of a foreign body moving in said water area may be accomplished with a plurality of detecting systems by operating the controls 20 of the respective detecting systems to maintain the indicators 16 thereof at their null position, to obtain maximum sensitivity, and observing which of said indicators shows the most deflection.

I claim:

1. A system for detecting and tracking foreign bodies in an underwater area, said system including a pair of spaced electrical transmitting terminals, a source of electrical energy supplying alternating current through said transmitting terminals into the water in said area, and a plurality of receiving systems, each of said receiving systems including a pair of spaced receiving terminals disposed in different positions within said area relatively to the receiving terminals of the other receiving systems, means for rotating said receiving elements relatively to the direction of flow of said current to attain an electrical balance between the power content at the opposite sides of said receiving elements, an indicating meter connected to said receiving terminals and having a scale for indicating upsets in said electrical balance, and means for controlling said rotating means.

2. The subject matter set forth in claim 1 wherein the said indicating meters and control means of each receiving system are contained in a common receiving station.

3. The method of detecting a foreign body entering an area in water, said method consisting of supplying a flow of electrical current through the water in said area, receiving current through a receiving means located in the path of said flow of current, adjusting said receiving means to obtain an electrical balance between the current at opposite sides of said receiving means, and then indicating any upset in said electrical balance.

4. The method of detecting a foreign body entering an area in water, said method consisting of supplying a flow of electrical current through the water in said area, receiving current from said area through receiving means in the path of the flow of said current, adjusting said receiving means to obtain a balance between the current at opposite sides of said receiving means until a null is indicated in the current received through said receiving means, and then observing said null indication for indication of an upset in said balance.

5. The method of detecting the entry of a foreign body into an area in water and determining the location of said body, said method consisting of supplying a flow of electrical current through the water in said area, receiving current from said area through a plurality of receiving means located at different points in said area, adjusting each of said receiving means to obtain a balance between the current flow at opposite sides thereof until a null is indicated in the current received through each of said receiving means, and then observing which of said null indications show a maximum upset in said balance.

6. The method of detecting the entry of a foreign body into an area in water which consists of transmitting alternating electrical current between a pair of spaced electrodes in said water, receiving current through a pair of spaced receiving electrodes disposed substantially at right angles to the line of flow of said transmitted current, indicating the flow of current through said receiving means, adjusting the angle of said receiving electrodes relatively to said line of flow until a null is indicated in the current received through said receiving means, and then observing said indication for any deviation therein.

References Cited

UNITED STATES PATENTS

| | | | |
|---|---|---|---|
| 1,209,680 | 12/1916 | Delany | 340—4 |
| 1,842,362 | 1/1932 | Nichols et al. | 324—1 |
| 1,951,387 | 3/1934 | Zuschlag | 324—1 |
| 2,967,506 | 1/1961 | Livermore | 114—240 |

FOREIGN PATENTS

| | | |
|---|---|---|
| 188,676 | 12/1922 | Great Britain. |
| 578,844 | 7/1946 | Great Britain. |

RODNEY D. BENNETT, *Primary Examiner.*

RICHARD A. FARLEY, *Examiner.*